United States Patent [19]
Dajer et al.

[11] Patent Number: 6,094,585
[45] Date of Patent: Jul. 25, 2000

[54] CDMA FORWARD LINK POWER OVERLOAD CONTROL IN A BASE STATION

[75] Inventors: Miguel Dajer, Succasunna; Frances Jiang, Whippany; Kyoung Kim, Bridgewater; Gregg Nardozza, Vernon, all of N.J.

[73] Assignee: Lucent Technologies Inc., Murray Hill, N.J.

[21] Appl. No.: 08/970,588

[22] Filed: Nov. 14, 1997

[51] Int. Cl.$^7$ ...................................................... H04Q 7/30
[52] U.S. Cl. .......................... 455/522; 455/561; 455/127; 455/115; 455/117; 375/140; 370/335
[58] Field of Search ..................................... 455/522, 127, 455/115, 117, 561, 403, 422, 423, 424; 375/140, 142, 146, 147, 150; 370/335, 342

[56] References Cited

U.S. PATENT DOCUMENTS

| | | | |
|---|---|---|---|
| 4,613,990 | 9/1986 | Halpern | 455/522 |
| 5,842,114 | 11/1998 | Ozluturk | 455/522 X |
| 5,884,187 | 3/1999 | Ziv et al. | 455/522 |
| 5,893,035 | 4/1999 | Chen | 455/522 |
| 5,898,868 | 4/1999 | Kanai | 455/522 X |

Primary Examiner—Fan Tsanf
Assistant Examiner—Philip J. Sobutka
Attorney, Agent, or Firm—Gibbons, Del Deo, Dolan, Griffinger & Vecchione

[57] ABSTRACT

A processor monitors the real time forward link power utilization in a base station, and a controller regulates the real time forward link power utilization in the base station. The processor and controller operate in a feedback configuration to maintain call quality and prevent damage to the base station. The processor determines real time forward link power utilization on a per frame basis by taking samples at a per chip rate within each frame. The forward link power is then obtained by taking the mean of the samples.

16 Claims, 4 Drawing Sheets

CDMA FORWARD LINK POWER OVERLOAD CONTROL IN A BASE STATION

FIELD OF THE INVENTION

This invention relates to the field of communications and in particular, to code division multiple access based communication systems.

BACKGROUND OF THE INVENTION

Communication systems employ Code Division Multiple Access ("CDMA") modulation techniques to permit a large number of system users to communicate with one another. In typical CDMA systems, communication is achieved by using spreading sequences for each channel that modulate the information bits to be transmitted between two communication units, for example between base stations and mobile stations. This results in a plurality of transmitted signals sharing the same frequency. The ability of such a system to work is based on the fact that each signal is time and/or frequency coded with a spreading sequence, such as with a pseudo-random noise ("PN") sequence, to permit signal separation and reconstruction at the receiver. Particular transmitted signals are retrieved from the communication channel by despreading a signal from all of the signals by using a known user despreading sequence related to the spreading sequence implemented at the transmitter.

The geographic coverage provided by the communication system is divided into coverage cells, where each cell corresponds to a base station. The cell is then further divided for certain types of base stations into multiple sectors, where each sector uses multiple carrier channels to transmit the voice or data bits to other communication units. One of many cell resource management problems that the base station must consider is how to manage forward link power utilization. The base station must determine how much power is being transmitted, such that the maximum power output of the base station amplifiers is not exceeded when additional power is requested. For example, when calls are added to a base station that employs no forward link power overload control, the power requests are accepted until the amplifier runs out of headroom, potentially reaching an overload condition. This overload condition can damage the base station and clip the transmitted signal, degrading the call quality.

In conventional CDMA systems that have some form of power control, only the highest levels of system management know the forward link power conditions. As a consequence, the feedback response is very slow between a base station's controller and the rest of the base station. There is no way the base station can quickly detect when forward link power utilization is approaching the limit of the sector power so as to protect the amplifier and to maintain existing call quality. Conventional base stations can reach maximum power without the base station control system realizing that an overload condition has occurred. These drawbacks of conventional base stations have required an over-design of the amplifiers to cope with the overload conditions. Extra margin on the amplifier translates into more expensive and larger systems without a guarantee that the base station will perform without the overloads.

SUMMARY OF THE INVENTION

The present invention is an apparatus and method for maintaining call quality and decreases the chances of overloading amplifiers by providing real time forward link power overload control in a base station. Importantly, the present invention is implementable in any CDMA based communication system.

In an exemplary embodiment of the present invention, a processor monitors the real time forward link power utilization in a base station, and a controller regulates the real time forward link power utilization in the base station. The processor and controller operate in a feedback configuration to maintain call quality and prevent damage to the base station. In an exemplary embodiment of the processor, the real time forward link power utilization is determined on a frame by frame basis by taking samples at a per chip rate within each frame. The forward link power is then obtained by taking the mean of the samples.

Advantageously, the apparatus and method of the present invention provide a relatively fast approach for determining if the base station can handle an additional call, process a hand-off or increase power to existing users without degrading the quality of existing calls and overloading the base station. Moreover, the present invention decreases the cost of base stations by not requiring more expensive, overdesigned amplifiers.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 1–4 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

Figure 1:
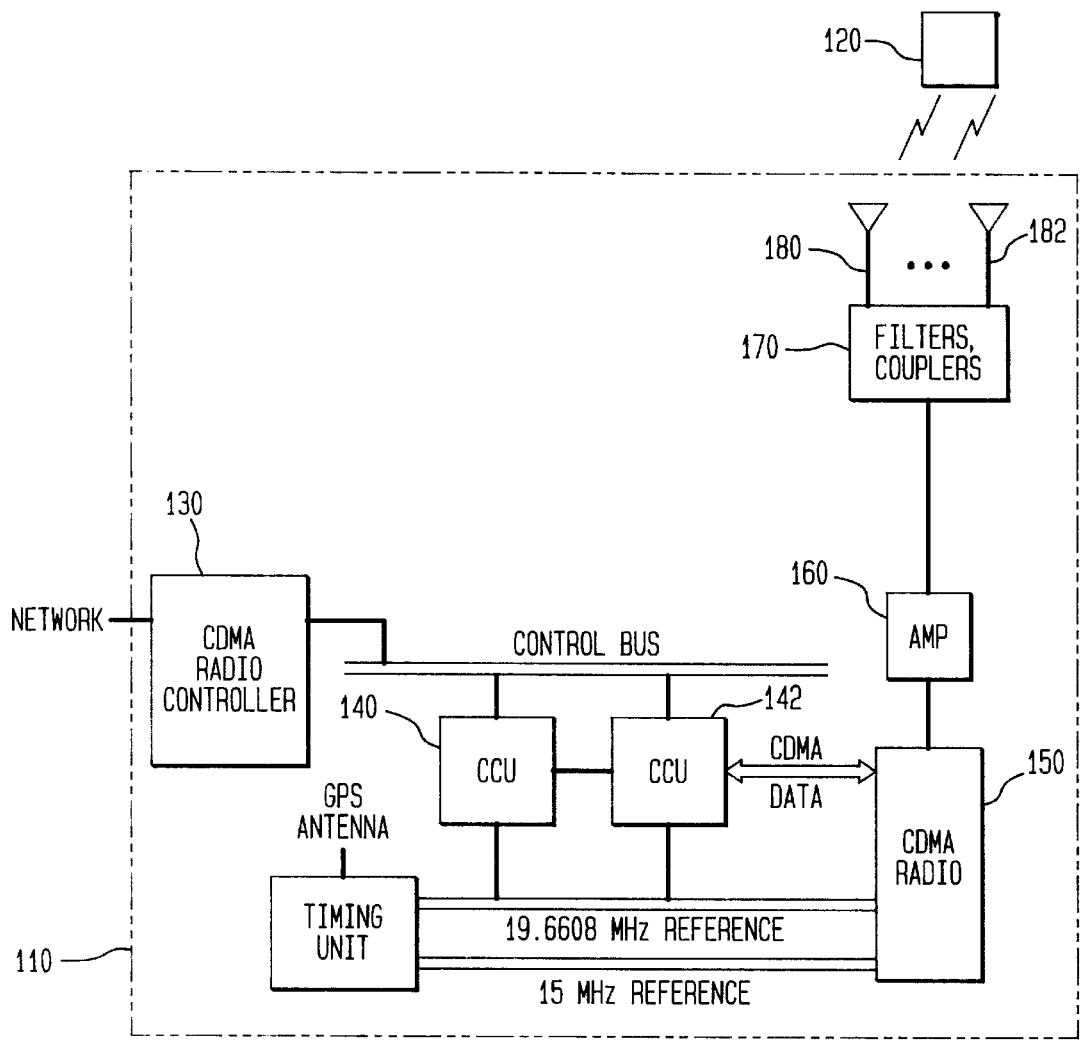
FIG. 1 is a prior art CDMA base station architecture.

Referring to FIG. 1, there is shown a typical CDMA communication system 100 that includes a CDMA base station 110 coupled to a network and wirelessly coupled to a representative mobile unit 120. The network is a collection of switches, routers, multiplexers/demultiplexers, transmission and access equipment that provides communication services via various attached communication units. CDMA base station 110 includes a controller 130, CDMA channel units 140 and 142, a CDMA radio unit 150 that includes a baseband transmit and receive section, an error section and a RF section, an amplifier 160, peripheral hardware 170 and antennas 180 through 182. Each CDMA channel unit is comprised of multiple channel elements, where a single channel element is required for each call being handled by the base station. Although only two channel units are shown, the number of CDMA channel units depends upon the type of base station.

Figure 2:
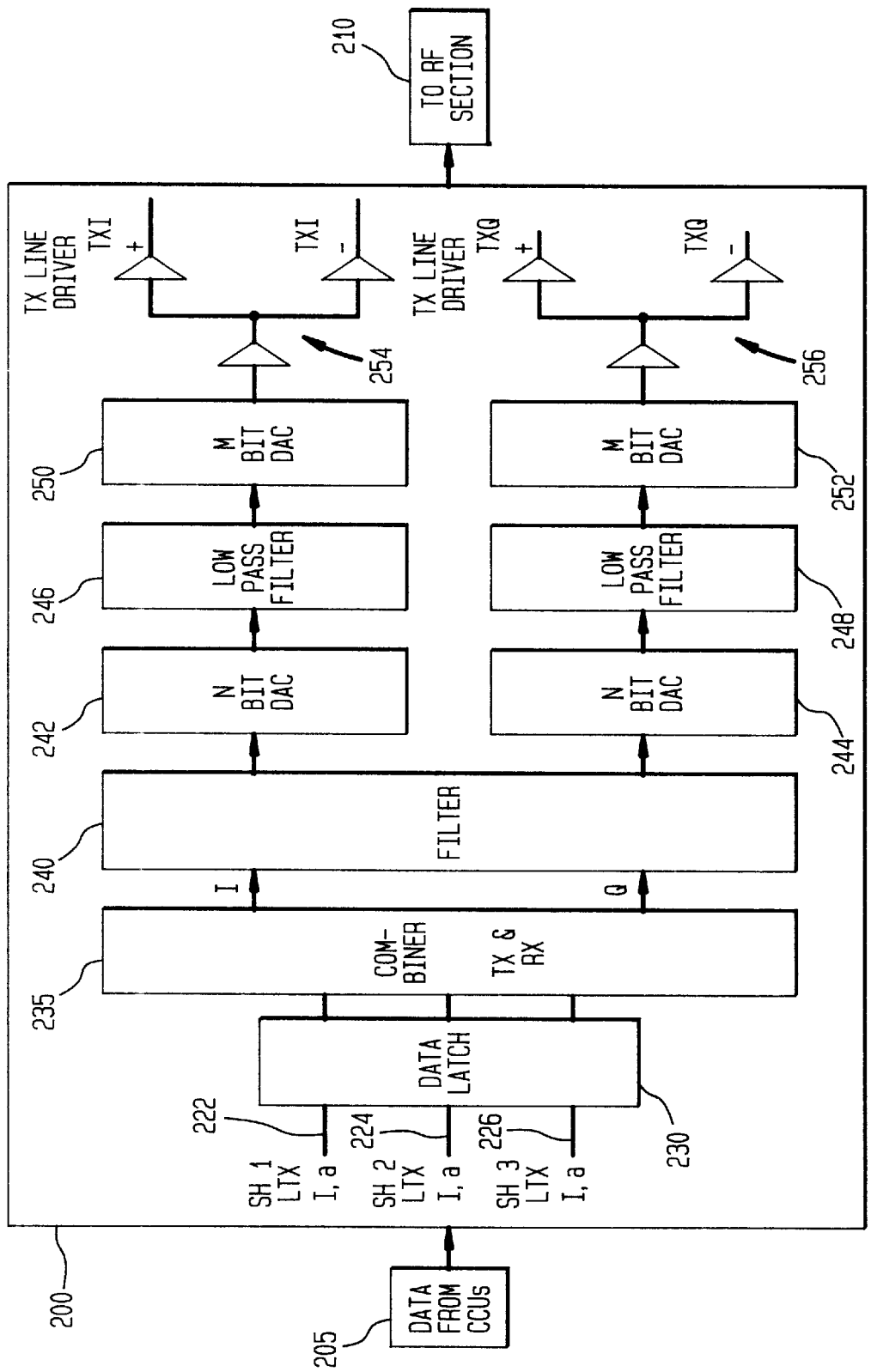
FIG. 2 is a prior art CDMA base station radio transmit baseband section.

Referring to FIG. 2, there is shown a typical baseband transmit section 200 of CDMA radio unit 150. Transmit section 200 includes multiple sector transmit busses 222, 224 and 226, a data latch 230, a combiner 235, a filter 240, a pair of N bit digital to analog converters ("DAC") 242 and 244, a pair of low pass filters 246 and 248, a pair of M bit DACs 250 and 252 and a pair of transmit line driver units 254 and 256. Although only three sectors are shown, the number of sectors is dependent upon the type of base station.

Referring now to both FIGS. 1 and 2, data from CDMA Channel Units 205 are combined for each sector and forwarded to sector transmit busses 222, 224 and 226. As would be understood by one skilled in the art, the data from CDMA Channel Units 205 are in the form of coded symbols or modulation symbols that are generated by sending the original voice data through voice coders, convolutional encoders, block interleavers, PN scramblers, puncture control processors, Walsh coders and spreading sequence spreaders. Note also that a standard CDMA frame interval is 20 msecs and that there are 384 modulation symbols within each interval. In the illustrative embodiment discussed below, each modulation symbol is spread with a 64 PN sequence or chip rate.

The modulation symbols from each of the multiple sectors are then sent through a combiner 235 to provide a single data stream of N bits for each of the in-phase ("I") and quadrature ("Q") components. The I and Q streams of N bits are then filtered by filter 240. These I and Q data streams are then converted to an analog band-limited signal via DACs and filters 242 through 252, respectively. After the baseband conversion, the I and Q signals are forwarded through transmit line drivers 254 and 256 to a RF section 210, where they are converted to RF for transmission.

Figure 3:
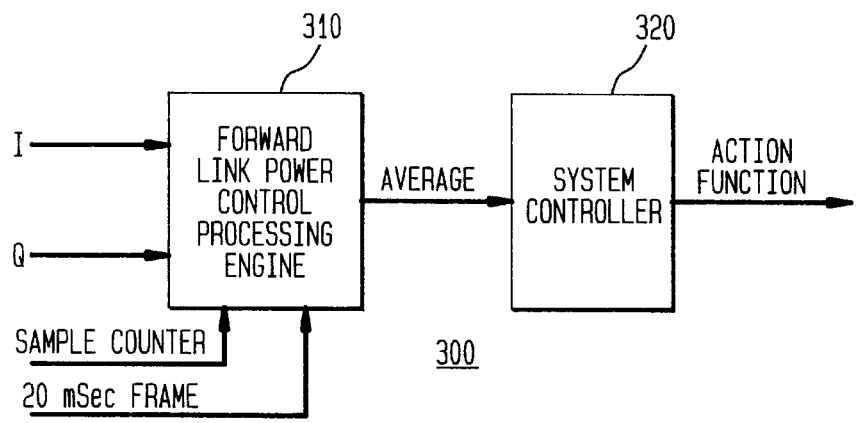
FIG. 3 is an exemplary block diagram of a forward link power control processing device in accordance with the present invention.

The present invention utilizes the I and Q information to determine when forward link power utilization is approaching a given power threshold for the base station. Specifically, the present invention determines if the base station can handle an additional call, process a hand-off or increase power to existing users without degrading the quality of existing calls and overloading the base station. Referring to FIG. 3, there is illustrated an exemplary forward link power control block diagram 300 that provides real time monitoring of the power being used by the base station on a frame by frame interval. The present invention uses a forward link power control processing engine 310 that continuously monitors the real time power in the CDMA forward path by calculating the average forward link power from sampled I and Q data. Specifically, processing engine 310 calculates the average power for each frame by sampling the I and Q data at the spreading sequence rate or chip rate. The average power is obtained by squaring the I and Q samples, summing the $I^2+Q^2$ samples and dividing by the total number of $I^2+Q^2$ samples. The average forward link power is then sent to system controller 320, which can then generate the appropriate action function in response to a request for more forward link power.

As stated above, the forward link power overload control method of the present invention obtains sample measurements every chip during the frame interval. The mean of the samples is then the estimated loading on the forward path. The present invention method is based on the analysis that the total average power (from all users) over a chip interval (which is 0.8138 $\mu$s) changes from one interval to another and reaches a maximum when the same signals from all of the users are aligned. Because of the orthogonality of Walsh functions over the modulation symbol interval, the total average power measured over a frame interval (20 ms or an interval of 384 modulation symbols) is the sum of the average power of the individual users. In addition, the total average power measured over a frame interval is the same as that measured over a modulation symbol interval. This is because the data rate and forward channel gain remain the same over a frame interval. In principle, total power for each of the 384 modulation symbols is the same over the entire frame interval. However, there are up to 16 power control bits punctured into the modulation symbols, and they may change the modulation symbol power depending on the power control bit gain. Since the location of the power control bit in different user bit streams is not the same, the total average power measured over a modulation symbol can vary from one modulation symbol interval to another. In addition to the power control bit, the signaling bits in the frame can also have different gains. Thus, it is necessary to take samples at a per chip rate in order to have an accurate read on the current power.

In summary, each 20 msec forward link frame has 384 modulation symbols. Each modulation symbol is spread with 64 PN chips. Thus, within each modulation symbol, the power varies at chip rate when processing multiple users. Moreover, there are 16 power control groups within each frame, each group having 12 data bits. Within the 12 data bits, one of the bits will be replaced by a power control bit. The bit to be replaced is a function of the PN long code and thus varies from user to user. Therefore, it is more exact to measure the total average power on a chip rate. Since there are 384 modulation symbols, and each modulation symbol is 64 chips, there are 24576 measurements, or 0.8138 $\mu$s per measurement. The average forward link power is thus obtained by summing the measurements and dividing by 24576. This information is then forwarded to the system controller for further processing and decision making with respect to requests for additional forward link power such as adding new calls, processing a hand-off or increasing power to existing users without overloading the base station and effecting the quality of existing calls.

Figure 4:
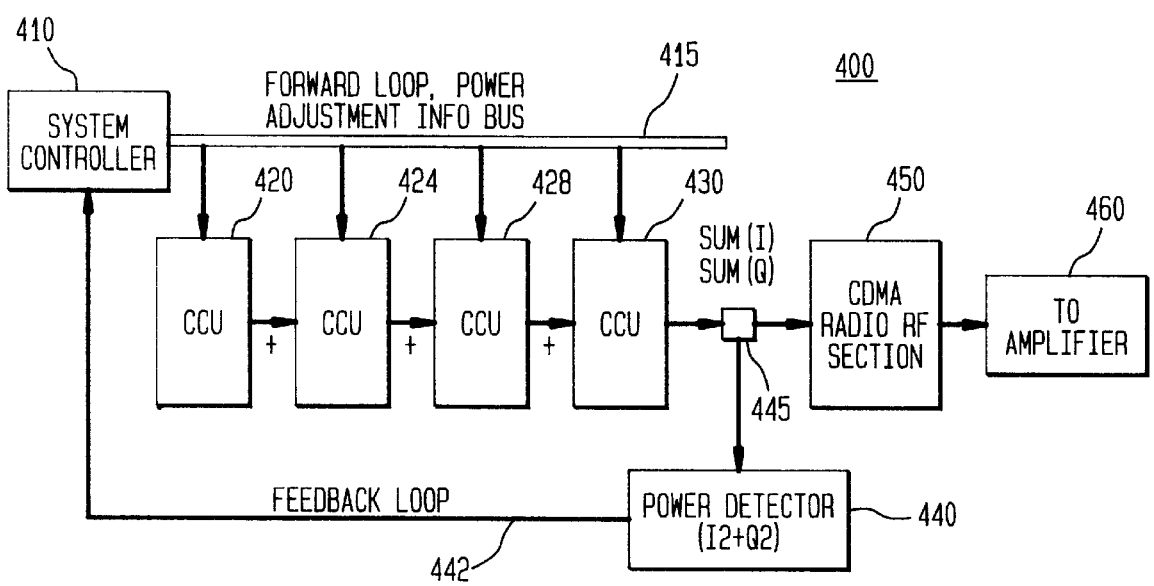
FIG. 4 is an exemplary embodiment of a forward link power control device in accordance with the present invention.

Referring to FIG. 4, there is shown an exemplary embodiment of a base station 400 that utilizes the forward link power control method of the present invention. Base station 400 includes a system controller 410, CDMA channel units 420–430, a power detector 440, a transmit section 445 of a CDMA radio unit, a RF section 450 of a CDMA radio unit and amplifiers 460. In accordance with the present invention, I and Q data from transmit section 445 are forwarded to power detector 440, which in turn sends the forward link power utilization values to system controller 410 via a feedback loop 442. System controller 410 then makes decisions regarding requests for additional power and generates responses that are forwarded to CDMA channel units 420–430 over an information bus 415.

The methodology of the present invention is now described with reference to FIGS. 3 and 4. Initially note that the forward link power measurements performed by processing engine 310 or power detector 440 are done for each sector and each carrier that is used by the base station. In accordance with the present invention methodology, the measurements of I and Q samples are obtained before entering the DAC. As stated previously, the samples must be obtained per PN chip on a frame by frame basis in order to maintain the accuracy of the measurement. Since there are 384 modulation symbols and each symbol is spread with 64 PN chips, a total of 384×64=24576 samples are required per frame. For each I and Q sample, the method calculates the sum $I^2+Q^2$. The method then totals all of the $I^2+Q^2$ samples for each frame. The average forward link power is then calculated by dividing the total of the $I^2+Q^2$ samples by the total number of samples, which is 24576. This result is then forwarded to the system controller. In an alternative embodiment, the total of the $I^2+Q^2$ samples can be sent to the system controller. The system controller will get an average power report for every frame, for each carrier within a sector.

The system controller uses this information to determine the current loading for each carrier within a sector by comparing it to a given threshold value. The loading information is used to determine if new power requests can be accepted. For example, the loading information can be used to select a traffic channel for a new call if power is available. A call admission process is implementable for the base station based on the total allocated transmit power in the base station by blocking all new calls when the average power is above a specified threshold. Power requests from existing users because of range requirements are also denied if the forward link power levels are above a certain threshold. Furthermore, the system controller will reject hand-offs from other base stations for the same reasons. In sum, after the sector or carrier hits maximum power utilization, all new gain increase requests (or power requests) are denied until the forward link power utilization has come down by a specified level. This could be implemented, for example, with a hysteresis loop.

Figure 5A:
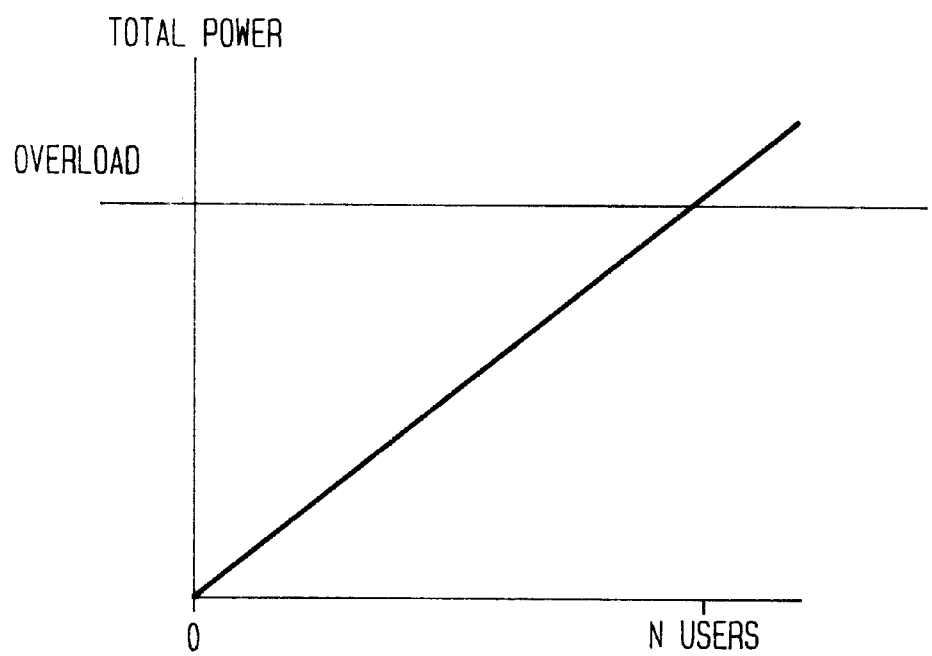
FIG. 5A illustrates what happens in prior art base stations as additional transmit power is added.
Figure 5B:
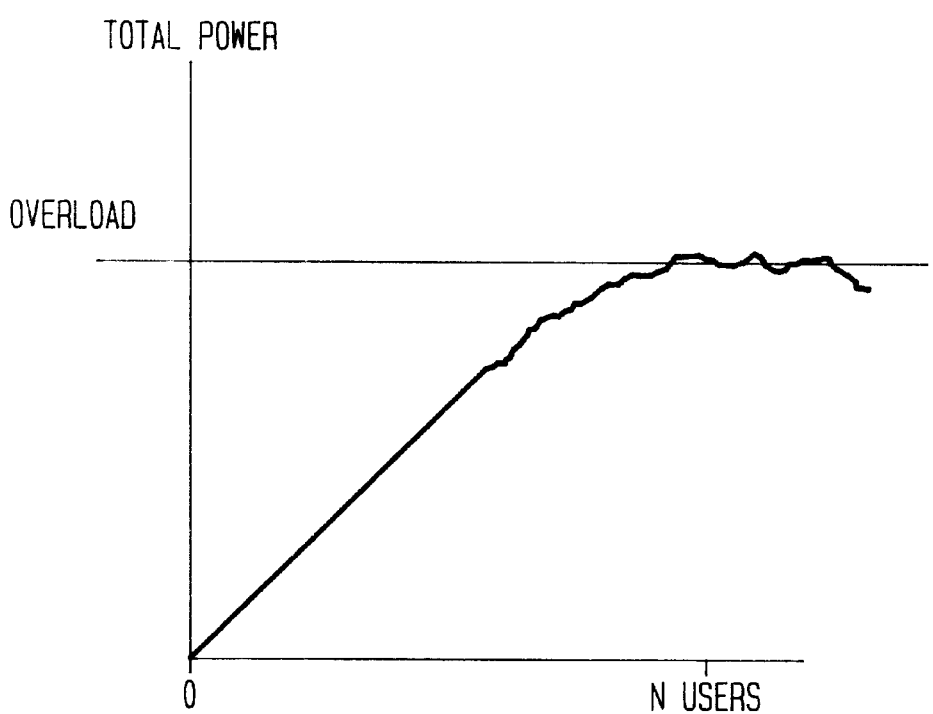
FIG. 5B illustrates what happens in a present invention base station as additional transmit power is added.

FIG. 5A illustrates what occurs when voice calls are added to a conventional CDMA base station. Conventional systems accept gain increase requests or additional power requests as long as the sum of the gains does not exceed the total gain when a clip message is received by the system controller. The advantage of this is that calls may be saved by still permitting gain increase if the total power used does not exceed the limit of the amplifiers. The disadvantage of this prior art approach is that it takes a longer time to retreat from the clipping state and the call quality during this time interval is degraded. In contrast, FIG. 5B illustrates what occurs when a forward link power overload control apparatus of the present invention is used in a base station. Since the present invention base station knows the total power allocated to the sector or carrier on a frame by frame basis, all new requests for power are rejected or blocked prior to reaching a clipping state. This maintains call quality throughout the system. As such, the forward link power control methodology allows the design of lower cost amplifiers by monitoring the real time power in the CDMA forward path and forwarding the information to the system controller for further processing.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. An apparatus for providing forward link power control in a base station, comprising:

a processor for monitoring real time forward link power utilization frame by frame in the base station wherein said processor determines said real time forward link power utilization by taking samples at a chip rate within each frame; and a controller for regulating forward link power allocation in the base station, wherein said processor and said controller operate in a feedback configuration to prevent overloading of the base station.

2. The apparatus according to claim 1, wherein said samples are samples of in-phase ("I") and quadrature ("Q") components of a data stream.

3. The apparatus according to claim 2, wherein said processor further includes:

a summer for calculating $I^2+Q^2$ for each sample in a frame; and a summer for summing all $I^2+Q^2$ samples for each frame.

4. The apparatus according to claim 2, wherein said processor further includes:

a summer for calculating $I^2+Q^2$ for each sample in a frame;

a summer for summing all $I^2+Q^2$ samples for each frame; and a divider for dividing a total $I^2+Q^2$ by a total number of samples.

5. The apparatus according to claim 1, wherein said controller responds to additional power requests by comparing said real time forward link power utilization against a threshold value.

6. An apparatus for providing forward link power control in a base station, comprising:

a processor for monitoring real time forward link power utilization in the base station; and a controller for regulating forward link power allocation in the base station, wherein said processor and said controller operate in a feedback configuration to prevent overloading of the base station and said processor determines said real time forward link power utilization by taking I and Q samples at a chip rate within each frame.

7. The apparatus according to claim 6, wherein said processor determines said real time forward link power utilization by taking a mean of all $I^2+Q^2$ samples within each frame.

8. The apparatus according to claim 7, wherein said controller includes a call admission means for, based on total allocated transmit power, blocking all new calls when said real time forward power utilization is above a specified threshold.

9. A method for providing forward link power control in a base station, said method comprising the steps of:

monitoring real time forward link power utilization in the base station frame by frame and taking in-phase ("I") and quadrature ("Q") samples at a chip rate within each frame; and allocating forward link power in the base station in response to said real time forward link power utilization and requests for additional transmit power such that overloading of the base station is prevented.

10. The method according to claim 9, wherein said step of monitoring includes the steps of:

calculating $I^2+Q^2$ for each sample in a frame; and summing all $I^2+Q^2$ samples for each frame.

11. The method according to claim 9, wherein said step of monitoring includes the steps of:

calculating $I^2+Q^2$ for each sample in a frame; and summing all $I^2+Q^2$ samples for each frame; and dividing a total $I^2+Q^2$ by a total number of samples.

12. The method according to claim 9, wherein said step of allocating is done by comparing said real time forward link power utilization against a threshold value.

13. The method according to claim 9, wherein said step of monitoring includes taking a sum of all $I^2+Q^2$ samples within each frame.

14. The method according to claim 13, wherein said step of monitoring further includes the step of calculating a mean of all $I^2+Q^2$ samples within each frame.

15. The method according to claim 14, wherein said step of allocating is done by comparing said real time forward link power utilization against a threshold value.

16. The method according to claim 14, wherein said step of allocating includes the step of admitting new calls, based on total allocated transmit power, by blocking all said new calls when said real time forward power utilization is above a specified threshold.

* * * * *